United States Patent
Odgaard

(10) Patent No.: US 9,810,200 B2
(45) Date of Patent: Nov. 7, 2017

(54) METHOD FOR CONTROLLING A PROFILE OF A BLADE ON A WIND TURBINE

(75) Inventor: Peter Fogh Odgaard, Hinnerup (DK)

(73) Assignee: KK WIND SOLUTIONS A/S, Ikast (DK)

( * ) Notice: Subject to any disclaimer, the term of this patent is extended or adjusted under 35 U.S.C. 154(b) by 414 days.

(21) Appl. No.: 14/391,470

(22) PCT Filed: Apr. 11, 2012

(86) PCT No.: PCT/DK2012/050121
§ 371 (c)(1),
(2), (4) Date: Oct. 9, 2014

(87) PCT Pub. No.: WO2013/152767
PCT Pub. Date: Oct. 17, 2013

(65) Prior Publication Data
US 2015/0078895 A1    Mar. 19, 2015

(51) Int. Cl.
*F03D 1/06* (2006.01)
*F03D 7/04* (2006.01)
*F03D 7/02* (2006.01)

(52) U.S. Cl.
CPC ............ *F03D 7/04* (2013.01); *F03D 1/0641* (2013.01); *F03D 7/0204* (2013.01);
(Continued)

(58) Field of Classification Search
CPC .... F03D 1/0641; F03D 7/0204; F03D 7/0224; F03D 7/0232; F03D 7/04; F03D 7/046
See application file for complete search history.

(56) References Cited

U.S. PATENT DOCUMENTS 6,033,180 A * 3/2000 Machida ............... B64C 27/001
244/215
2010/0014969 A1 * 1/2010 Wilson ................. F03D 7/0224
416/1
(Continued)

FOREIGN PATENT DOCUMENTS

CN    101092931 A    12/2007
CN    101469670 A    7/2009
(Continued)

OTHER PUBLICATIONS

J. Friis, E. Nielsen, J. Bonding, F. D. Adegas, J. Stoustrup and P. F. Odgaard, "Repetitive model predictive approach to individual pitch control of wind turbines," 2011 50th IEEE Conference on Decision and Control and European Control Conference, Orlando, FL, 2011, pp. 3664-3670. doi: 10.1109/CDC.2011.6160948.*
(Continued)

*Primary Examiner* — Woody Lee, Jr.
(74) *Attorney, Agent, or Firm* — Pearne & Gordon LLP

(57) ABSTRACT

The invention regards an apparatus or method for controlling the profile of a blade on a wind turbine having at least a first blade and a second blade, the first blade comprise at least one first sensor system adapted to determine a first blade state and the second blade comprise at least one second sensor system adapted to determine a second blade state, wherein the profile of the second blade is controlled based on the determined first blade state and the determined second blade state.

21 Claims, 5 Drawing Sheets

(52) U.S. Cl.
CPC ......... *F03D 7/0224* (2013.01); *F03D 7/0232* (2013.01); *F03D 7/0268* (2013.01); *F03D 7/046* (2013.01); *Y02E 10/721* (2013.01); *Y02E 10/723* (2013.01)

(56) References Cited

U.S. PATENT DOCUMENTS

| | | | |
|---|---|---|---|
| 2011/0178771 A1* | 7/2011 | Miranda | F03D 7/0224 702/182 |
| 2011/0193343 A1* | 8/2011 | Nakashima | F03D 7/0224 290/44 |
| 2011/0229300 A1 | 9/2011 | Kanev et al. | |
| 2012/0128488 A1* | 5/2012 | Kristoffersen | F03D 7/0224 416/31 |
| 2012/0211986 A1* | 8/2012 | Bertolotti | F03D 7/042 290/44 |

FOREIGN PATENT DOCUMENTS

| | | |
|---|---|---|
| CN | 102338034 A | 2/2012 |
| EP | 1 666 723 A1 | 6/2006 |
| WO | 2010020450 A1 | 2/2010 |

OTHER PUBLICATIONS

PCT International Search Report; International Application No. PCT/DK2012/050121; International filing Date: Nov. 4, 2012; Applicant: KK Electronic A/S; Date of Actual Completion of International Search: dated Dec. 14, 2012; Date of Mailing of International Search Report: dated Dec. 12, 2012.

"Individual Pitch Control for Variable Speed Turbine Blade Load Mitigation"; Yao Xingjia, et al.; Sustainable Energy Technologies, 2008; ICSET 2008; IEEE International Conference , Piscataway, NJ, USA, Nov. 24, 2008; Wind Energy Institute, Shenyang University of Technology, Shenyand 110023, China.

"Repetitive Model Predictive Approach to Individual Pitch Control of Wind Turbines"; 2011 50th IEEE Conference on Decision and Control and European Control Conference (CDC-ECC), Orlando, FL, USA, Dec. 12-15, 2011.

* cited by examiner

METHOD FOR CONTROLLING A PROFILE OF A BLADE ON A WIND TURBINE

CROSS-REFERENCES TO RELATED APPLICATIONS

This application is the national phase of international Application No. PCT/DK2012/050121 filed on Apr. 11, 2012, the entire disclosure of which is incorporated herein by reference.

FIELD OF INVENTION

The invention relates to a method for controlling a profile of a blade on a wind turbine having at least a first blade and a second blade.

BACKGROUND OF THE INVENTION

A wind turbine generates electrical energy by converting the energy in the wind. The electrical energy can be supplied to the electric power transmission network. They have conventionally been situated on land. However, the last few years there have been a growth of offshore wind turbines. In addition, the wind turbines are becoming larger, with a rotor of diameter 80 meters and above, which calls for optimisation of the wind turbine, both to minimise the wear of the wind turbine and to maximise the generated electricity.

Optimisation of the wind turbine can for example be optimising the control system. This is important for new wind turbines as well as already operating wind turbines.

It is known in the art that it is possible to optimise the performance of the wind turbine by pitch control of the blades. For example, in WO 2008/041066 A1 disclose an apparatus for controlling a wind turbine having a number of rotor blades comprising a method of moment imbalance compensation. The wind turbine uses a pitch command to control pitch of the rotor blades of the wind turbine. The control first determines and stores a relationship between various values of instantaneous moment and a pitch modulation, which compensates for deviations of the instantaneous moment from a nominal moment value. The control senses an instantaneous moment of the wind turbine resulting in a moment signal. The control uses the moment signal to calculate a blade pitch modulation needed to compensate for the instantaneous moment imbalance. The calculated blade pitch modulation is, combined with the nominal pitch command, determined to control the rotor rpm for example. Finally, the combination is used to control pitch of the rotor blades in order to compensate for the instantaneous moment deviations of the wind turbine.

SUMMARY OF THE INVENTION

Considering the prior art described above, it is an object of the present invention to optimise the performance of the wind turbine.

The object can be achieved by means of a method for controlling a profile of a blade on a wind turbine having at least a first blade and a second blade. The first blade comprise at least one first sensor system, adapted to determine a first blade state and the second blade comprise at least one second sensor system, adapted to determine a second blade state, wherein the profile of the second blade is controlled, based on the determined first blade state and the determined second blade state.

Thus, it is possible to optimise the control of the wind turbine by ensuring a higher output and/or lower wear of the wind turbine. This is done by controlling the second blade profile based, at least partly, on the blade state of the first blade. In this way the control system for controlling the profile of the second blade can, at least partly, use information from the control system controlling the profile of the first blade in order to optimise the amount of energy the second blade is able to capture from the wind.

"Profile of a blade" is to be understood as the attack profile of the blade on the air flow. The profile can for example be controlled by the pitch angle of the blades, the yaw angle of the rotor (which changes the attack angle of the blades), flaps on the blades, flexible airfoiles, dielectric barrier discharge plasma actuators, micro taps or any combination thereof. In an embodiment, the profile of a blade is the pitch angle of a blade.

It is to be understood that by "controlled" it is not meant, exclusively controlled, but only that the profile of the second blade is, at least partly, controlled based on the determined first blade state and the determined second blade state.

In an embodiment, the determined second blade state is time delayed in relation to the first blade state. The first blade can be considered to be in front of the second blade when the rotor of the wind turbine is rotating i.e. the first blade passes a point in the rotor plane before the second blade passes the same point in the rotor plane. Hence the control system of the second blade can benefit from knowledge of operational parameter and measurements related to the first blade in determining the future profile of the second blade.

In an embodiment, the first blade state is determined at a first blade position in the rotor plane and the second blade state is determined at a second blade position in the rotor plane. When the blades are rotating they are rotating in what is referred to as the rotor plane i.e. the blades pass each point in the rotor plane once per revolution. It is very advantageous to relate the blade state of the individual blades to a blade position in the rotor plane. In this way, it is possible to obtain an analysis e.g. the first blade state in a first blade position together with other measurements such as wind speed measurement or blade state of other blades in other blade positions.

Preferably, the first blade position in the rotor plane is substantially the same as the second blade position in the rotor plane. It is advantageous to be able to use information from the first blade state at one or more first blade positions in the rotor plane when controlling the second blade when the second blade position becomes substantially the same as the one or more first blade positions. It is then possible to optimise control of the second blade based on at least three strategies: a strategy for maximum load on the blade and/or a strategy for optimising the energy captured from the second blade and/or a strategy for optimising the life time of the components of the wind turbine.

It is advantageous to be able to take a snap shot of e.g. operational parameters and load measurements of a first blade, in a first blade position in the rotor plane and use this information e.g. when determining the pitch angle of the second blade, when the second blade arrives at the first blade position.

Furthermore, by knowledge of the blade state in a blade position, it becomes possible to compare blade states between wind turbines in a wind power park. If a first wind turbine with three blades provide blade state information of the three blades in three blade positions, this information can be used to control the profile of the three blades of a second wind turbine in the wind power park. The second wind turbine can, for example be positioned downwind of the first wind turbine.

In an embodiment, the first blade state is defined by a blade moment of the first blade, and/or a pitch angle feedback of the first blade, and/or a deflection of the first blade and/or an acceleration of the first blade, and/or the second blade state is defined by a blade moment of the second blade, and/or a pitch angle feedback of the second blade, and/or a deflection of the second blade and/or an acceleration of the second blade. A blade state can, for example, be described by dominating features from the above mentioned signals i.e. maximum, minimum, average, repeating sequences, frequency spectrums, time-frequency frames or other e.g. unexpected values. In an example the blade state is defined by the average pitch angle feedback, in other words the blade state "is" the average pitch angle feedback. The blade state describes the actual state of the blade i.e. the torque acting on the blade, deflection of the blade, ice or fouling on the blade, pitch angle of the blade, damages of the blade (cracks or deterioration e.g. from strokes of lightning), acceleration of the blade, etc. Of cause the blade state could also be a combination hereof. Hence, it is very advantageous to take the blade state of a first blade into account, when controlling the second blade, especially when the first blade is in front of the second blade in the rotation of the blades in the rotor plane.

In an embodiment, a control system ascertain the validity of the determined first blade state and/or determined second blade state by comparing the determined first blade state and the determined second blade state. It is very advantageous to be able to compare the determined blade state from one or more blades, because a simple comparison and analysis of the comparison result can reveal that something is not as expected and appropriate actions can be initiated to remedy the cause of the unexpected.

Preferably, the control system ascertain the validity of the second blade state in a point in the rotor plane by comparing the determined second blade state with the determined first blade state in substantially the same point in the rotor plane. As mentioned, the blade state of a first blade may be used in the control of a second blade. Hence, it is important to be able to verify that the determined blade states are valid. One advantageous way of validating a blade state is to compare the blade state of a first blade with a blade state of a second blade in the same or close to the same point in the rotor plane.

Advantageously, the validity is based on the difference in the blade states. As mentioned, the blade state of a blade comprise information related to that specific blade. It is preferred that the individual blade state of all the blades of a wind turbine is defined by the same set of blade related information. In this way it will be possible to compare the blade state of two or more blades and if differences are detected, this may question the validity of at least one of the blade states.

The blade state is determined based on output from a sensor or sensor system. Hence, the sensor or sensor system can be the source of an invalid blade state. It is thus advantageous to use a comparison of the blade state of two or more blades, to verify sensor output and thereby indicate if a sensor or sensor system fails.

Furthermore, the type of difference between two compared blade states may indicate exactly which sensor or part of a sensor system that fails.

The invention also regards an apparatus for controlling a profile of a blade on a wind turbine, having at least a first blade and a second blade comprising a first blade sensor, adapted to determine a first blade state of the first blade, a second blade sensor, adapted to determine a second blade state of the second blade, a second blade controller, adapted to control the profile of the second blade wherein the second blade controller, control the profile of the second blade on the basis of the determined first blade state and the determined second blade state.

By use of the apparatus, according to the invention, it is possible to optimise the control be ensuring high output and/or low wear on the wind turbine.

In an embodiment, the first blade sensor determines the first blade state in a first blade position in the rotor plane and the second blade sensor determines the second blade state in a second blade position in the rotor plane. Preferably the first blade position in the rotor plane is substantially the same as the second blade position in the rotor plane.

Identifying the blade state position in the rotor plane, makes it easier for the controller to optimise the second blade profile as the states of the blades are then related to a specific position.

Preferably, the second blade state of the second blade is time delayed in relation to the first blade state of the first blade. Hence, the control system of the second blade can benefit from knowledge of operational parameter and measurements, related to the first blade in the determining of the future profile of the second blade.

In an embodiment, a control system ascertains validity of the second blade state by comparing it with the first blade state, preferably the validity is based on the difference in the blade states. This enables the control system to detect if the sensor is faulty.

Further, the invention regards a wind turbine controlled by a method according to the present invention or an apparatus according to the present invention.

DESCRIPTION OF THE DRAWINGS

In the following, the invention will be described in greater detail with reference to the accompanying drawings.

DETAILED DESCRIPTION OF THE INVENTION

Figure 1:
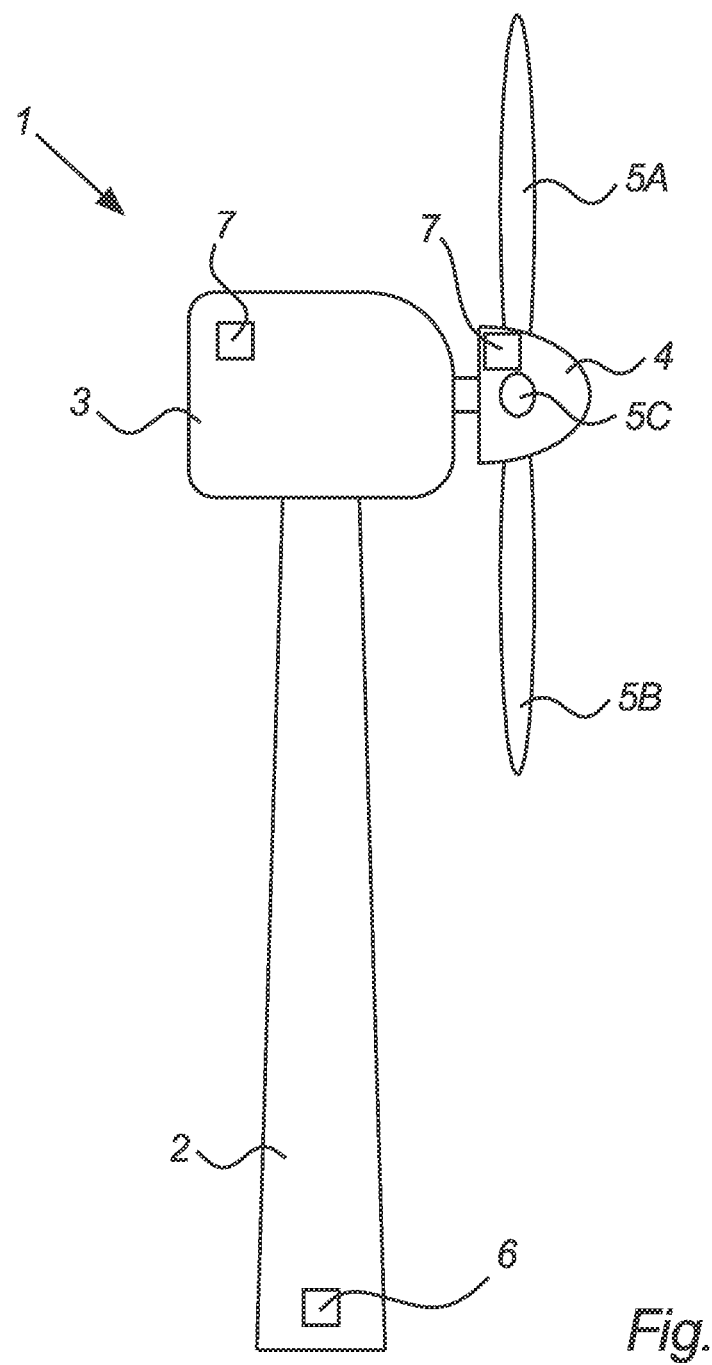
FIG. 1 illustrates a wind turbine in a side view according to an embodiment of the invention.

FIG. 1 illustrates a side view of a wind turbine 1. The wind turbine 1 comprise a tower 2, nacelle 3, hub 4 and three blades 5A, 5B, 5C. The wind turbine is controlled by a control system 12 comprising wind turbine controller 6 which may communicate with a plurality of sub control modules 7 for controlling different parts of the wind turbine 1.

The word control in relation to the present invention, it is preferably thought of as the control of the blade profile by changing the pitch angle, but also if the blades can change profile e.g. due to flaps, blade length adjustment, etc. this knowledge can be used to control the blade profile.

The blades 5A, 5B, 5C of the wind turbine 1 are rotably mounted on the hub 4 and together referred to as the rotor. The rotation of the blades along their longitudinal axis is referred to as pitch or pitching of the blades. The wind turbine control system 12 control the pitch of the blades, so that when wind is passing the blades 5 lifting force is created, which initiates rotation of the rotor.

Figure 2:
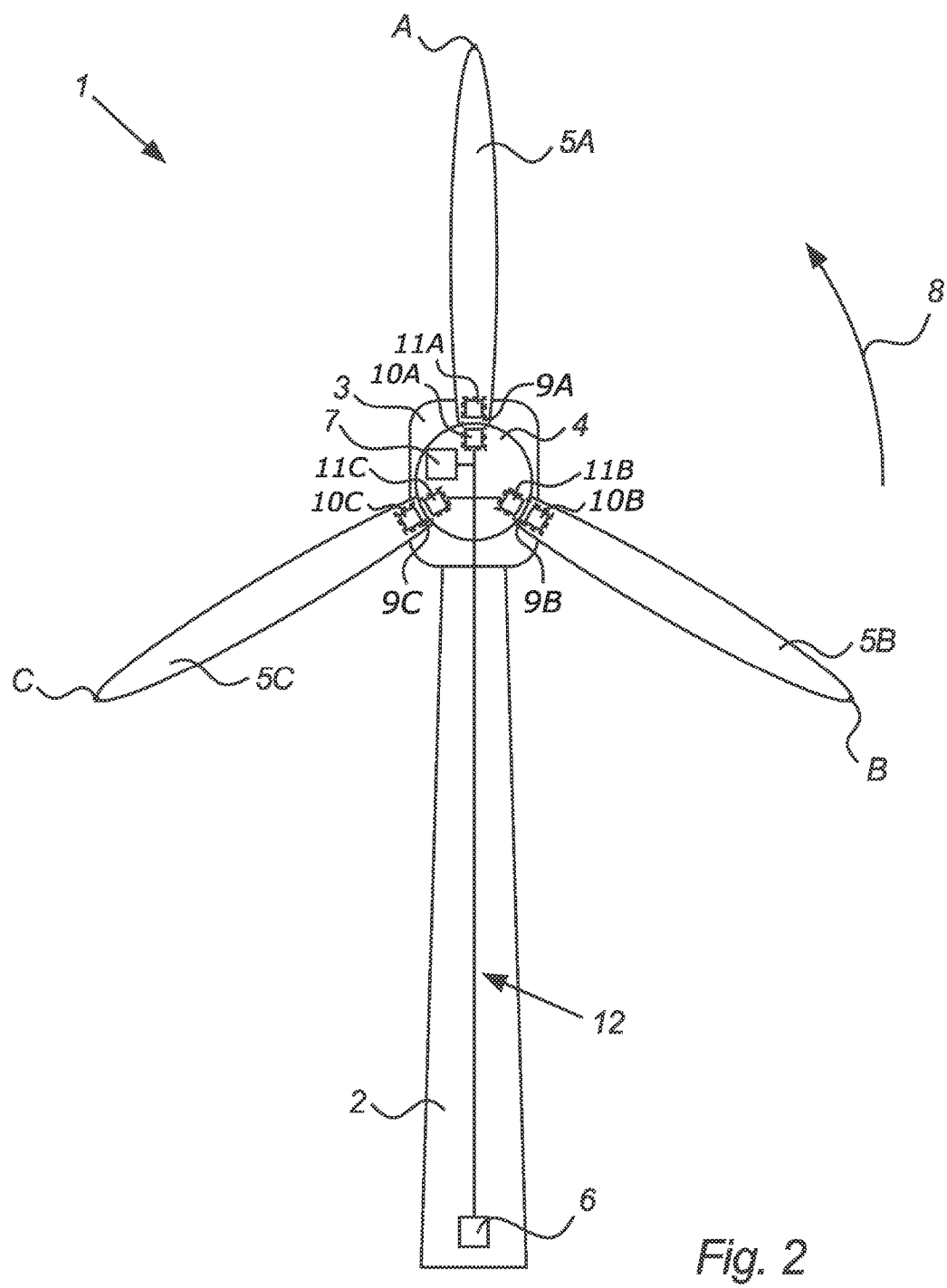
FIG. 2 illustrates a wind turbine in a front view according to an embodiment of the invention.

FIG. 2 illustrates a front view of the wind turbine 1. The blades 5A, 5B, 5C are illustrated at positions A, B, C respectfully in the rotor plane. The rotor rotates counter clockwise as indicated by the arrow 8. Sensor systems 9A, 9B, 9C are illustrated in relation to each of the blades 5A, 5B, 5C as located partly in the blades 5 partly in the hub 4 which is only one configuration of the sensor system 9 according to the present invention.

The sensor systems 9 are preferably understood as one or more sensors 10 for monitoring the blades 5 of the wind turbine 1 and controllers 11A, 11B, 11C for processing the measured data. Alternatively, the sensors 10 are communicating with one or more sub controller module 7 or with the wind turbine controller 6, which then processes the measured data.

Typically the sensor systems 9 are identical i.e. the first and second sensor systems 9A, 9B are monitoring the same parameters in relation to the first and second blade 5A, 5B. On wind turbines with three, four, etc. blades a third, fourth, etc. blade sensor system similar to the first and second blade sensor systems are preferably present.

It should be noted, that according to the invention it is advantageous that the output parameter from the sensors 10 of the sensor systems 9 are the same, but this is not essential. Hence, one parameter measured and returned from sensors 10 of a first sensor system 9A may not be measured by sensors 10 of a second sensor system 9B.

Sensors 10 of the sensor systems 9 may be located in the blades 5 either in the interior of the blades 5 moulded in the structure of the blades 5 (e.g. (optical) strain gauge) or as part of the attachment of the blades 5 to the hub 4 (e.g. one or more bolts with strain gauge capabilities) or in/at the nacelle 3 (not shown) or tower 2 (e.g. optical or visual based sensors), etc.

It should be noted, that a sensor 10 of a sensor system 9 may comprise a sub sensor system (not shown). An example of such sub sensor system can be the sensor elements (receiver/transmitter), necessary if e.g. blade deflection is measured by means of triangulation.

The controllers 11 of the sensor systems 9 may be dedicated controllers for processing data from sensors 10 of one or more sensor systems 9, it may be part of a sub controller 7 for controlling part of the wind turbine 1 or it may be part of the wind turbine controller 6 (i.e. the main controller).

The data monitored by the sensor systems 9 is used to determine the state of the blades 5 i.e. the blade state. Monitored data could e.g. be blade moment, pitch angle feedback, deflection of the blade, acceleration of the blade, blade rod torque, torque acceleration, etc. Hence the blade state may be output from the sensor system 9 or may be determined based on data from the sensor systems 9. Based on the state of a blade 5 the load of the blade 5 may be controlled e.g. by controlling the pitch angle of the individual blades 5.

FIG. 2 illustrates that the blades 5 are symmetrically mounted on the hub 4, preferably spaced by 120 degrees. FIG. 2 illustrates a snapshot of a wind turbine taken at time t0 of blade 5A in blade position A, blade 5B in blade position B and blade 5C in blade position C.

Generally, the blade states can be said to be time delayed in relation to each other. For example, the blade state of blade 5B is time delayed in relation to the blade state of blade 5A. This is because at the time t0 blade 5B is in point B in the rotor plane and at the time t1 (t1>t0) blade 5B has moved to point A. Accordingly, it takes the time t1 to rotate blade 5B from point B to point A.

The time delay arises from the distribution of the blades in the rotor plane. The time t1 can be calculated as the time for one blade to rotate one revolution divided by the number of blades of the rotor, which for most modern wind turbine will be three. Typically the time t from when a first blade 5A leaves a first blade position A to a second blade 5B arrives at that first blade position A is not above one second.

Compared to changes in the wind, such as wind speed and direction, the time t (i.e. time of rotation of the blades 5) is fast. This means that the wind conditions is expected to be the same for the first blade 5A at position A at time t0 and the second blade at position A at time t0+t1. This can be used in the control of the blades 5 or other subsystems of the wind turbine, for example, fast yaw systems. In the following, a way of using the expected wind condition for the second blade at position A at time t0+t1, when controlling the profile of the blades 5 by means of controlling the pitch of the blades 5, is explained.

The first blade state can be determined at the time t0 for blade 5A when the blade 5A is in point A in the rotor plane. As the rotor rotates in the direction of the arrow 8, the second blade state can be determined as the state of the blade 5B when it reaches point A, which happens at the time t0+t1.

When blade 5A is in point A the wind turbine control system 12 has real-time (snapshot) information of the blade state of blade 5A (at time t0) based on measurements from sensor system 9A. This information will, at least preferably, comprise parameters related to pitch angle and loads acting on the blade 5A.

Within the time t1 blade 5B is going to arrive in point A, i.e. the blade 5B arrives at point A at time t0+t1. t1, for example could be 1, 2 or 3 seconds. As the time t1 is relatively small compared to the time it takes for the wind to change the wind is expected to be almost the same as it was at time t0. This is because the wind is not expected to change within seconds.

The wind turbine control system 12 has information from the parameter setting of blade 5A in point A at time t0. This information can be used when controlling the parameter settings of blade 5B as it approaches and arrives at point A. This means, that if the wind turbine control system 12 has information of the pitch angle and/or blade rod torque of blade 5A in point A and evaluates that the blade rod torque is too high, the wind turbine control system 12 will initiate adjustment of the pitch angle of the blade 5B in advance so that there is a chance that blade 5B, when it arrives in point A, has the optimal pitch angle.

This new pitch angle for blade 5B may found form a correlation of the actual parameter settings of blade 5A in point A with input from sensors system 9A measuring parameters related to blade 5A in point A.

The above example is only one way of implementing the general principle of the invention, which is that a second blade is controlled based on information of a first blade where the first blade is in front of the second blade when the rotor rotates.

Hence, with reference to the embodiment illustrated in FIG. 2, blade 5A can be interpreted to be the first blade, blade 5B the second blade and blade 5C to be the third blade. The order is of cause not important as blade 5C can have been chosen as the first blade making blade 5A the second blade and blade 5B the third blade and so on, if the wind turbine was equipped with more than three blades.

It should be noted, that as the rotor diameter increases the speed of rotation (and thereby time t1) is preferably increased in order to obtain the same relationship between wind speed and rotation speed of the tip of the blade.

It should be noted, that even though only the first and second blade were used in the example above, the invention is not limited to this. In some situations it will be very advantageous to use information of the blade state of the first and second blade when controlling the third blade. With reference to FIG. 2, information of the blade state of the first blade 5A and second blade 5B, will be used when controlling blade 5C.

Furthermore, it should be noted, that the use of specific points A, B, C in the example above is necessary to explain the invention, but in an actual control situation, there may be a plurality of points all around the rotor plane. This is advantageous since the information of the blade state of a first blade can be used continuously, making continuous control of pitch angle of the second and/or third blade possible.

It should be noted, that even though it is not mentioned above, the information of the blade state of the blade to be controlled is also used in determining the parameter settings (such as pitch angle), which defines the blade profile for that specific blade. For example, the control parameters for controlling blade 5B in point A at time t0+t1 can be; the in situ (at t0+t1) state of the blade 5B in point A and the state of the blade 5A in point A at the time t0. The parameter setting can also be dependent on the state of the blade 5C in point A at the time t0−t1. Generally the blade profile in a point in the rotor plane can be determined based on any previous blade state for blades at that point in the rotor plane.

As a matter of fact in situations where the wind is steady i.e. there is no or only a small change in wind speed and/or direction the settings of operation parameters of blade 5A can be copied to blades 5B and 5C. This is very advantageous in case of sensor fault which then may not affect the production of energy. Therefore the present invention has additional advantages in control of wind turbines located in sites with steady wind. Hence control systems for wind turbines located in the front row of a wind power park or wind turbines in one single row could even use or verify control parameters from each other.

Hence, the second blade (5B in the example above) may be controlled based on blade state information from the first blade (5A in the example above) and based on the blade state of the second blade itself. This information may be provided by the sensor systems 9A, 9B respectively. Besides the blade state information, the blades 5 may of course, also be controlled based on other known information or normal control parameters, such as environmental inputs (wind, temperature, etc.), requirements to production, geographic location, etc. such information may origin from the wind turbine to be controlled, neighbouring wind turbines, substations, grid operators, etc.

Figure 3:
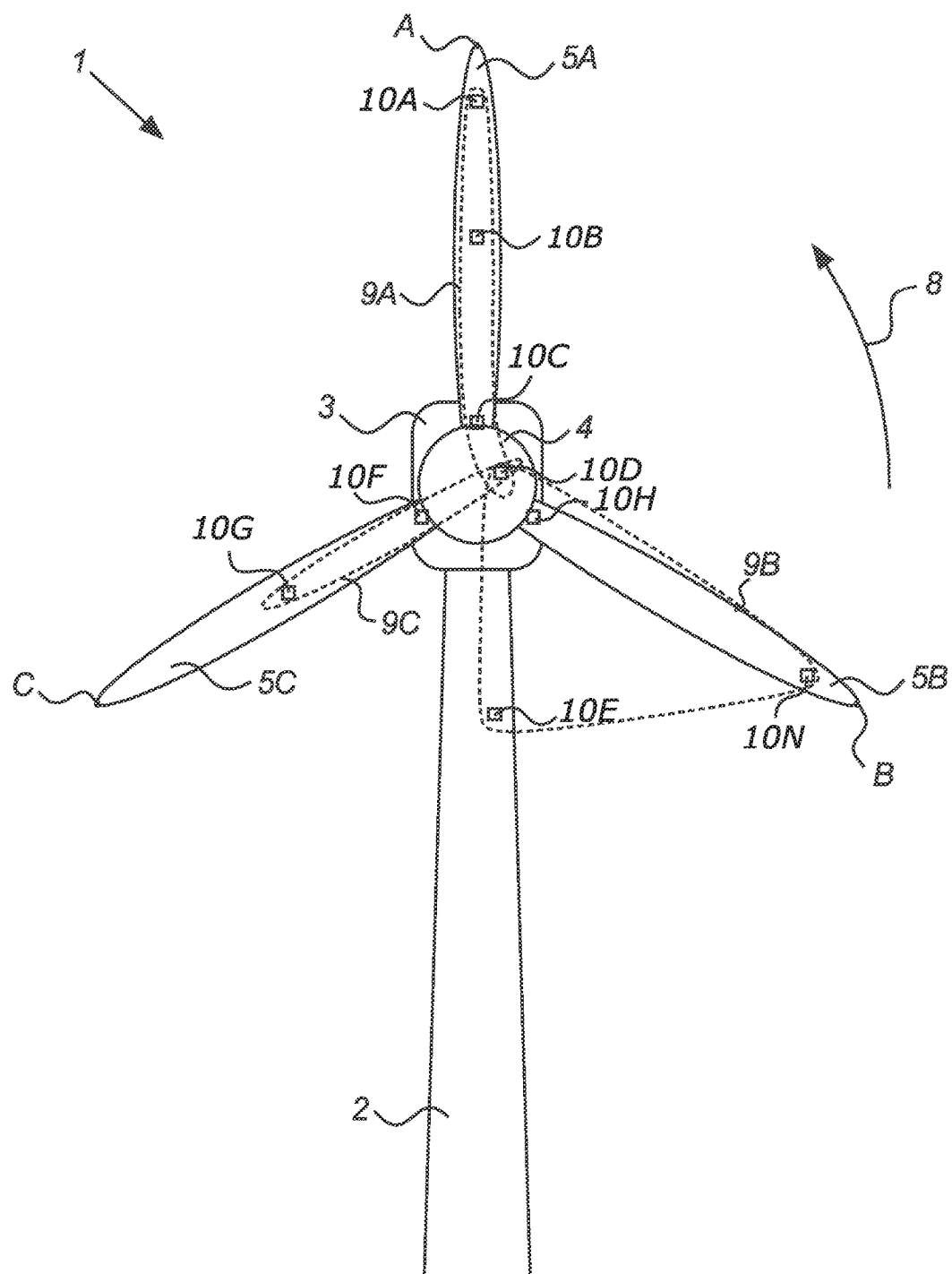
FIG. 3 illustrates sensors on a wind turbine according to an embodiment of the invention.

FIG. 3 illustrates examples of location of sensors 10A-10N of the sensor systems 9A, 9B, 9C. The illustrated sensors can belong to the sensor systems 9 as follows: Sensors 10A, 10B, 10C, 10D belongs to sensor system 9A, sensors 10D, 10F, 10G belongs to sensor system 9C and sensors 10D, 10E, 10H, 10N belongs to sensor system 9B.

As can be seen, the sensor systems 9 can share one or more sensors (10D) and furthermore sensors may be located on the blades 5, tower 2, hub 4 and nacelle 3 (not shown).

Today it is common to shut down or at least derate the production of the wind turbine 1 if one or more sensors fail to be able to control the wind turbine 1 safely and avoid e.g. blades 5 colliding with the tower 2. According to the present invention, it may not be necessary to shut down or derate the wind turbine 1 in case a sensor 10 fails.

According to an embodiment of the present invention, it is possible to mutually validate the blade state of the blades 5 and thereby at least indirectly validate the sensors 10 of the sensor systems 9. Because the wind turbine control system 12 are using the blade state of a first blade 5A together with the blade state of a second blade 5B to control the second blade 5B the wind turbine control systems 12 will, in most cases, receive input from sensors 9 measuring the same parameter in the first and second blades.

By comparing input values from two or more sensor systems 9 it is possible to validate the received input and thereby the sensor system 9 and then also indirectly the blade state. Preferably the validation process is done more than once and furthermore it might improve the validation if the compared values from two different blades 5 are measured in the same point or dose to the same in the rotor plane.

If it turns out that the blade state of two different blades are the same or close to the same in the same point in the rotor plane, the validity of the blade stated could be said to be valid.

For example, the blade rod torque which is almost always measured in all blades 5. In FIG. 3 the blade rod torque will be measured by sensors 10C, 10F, 10H. If the blade rod torque of e.g. a second blade 5B is not as expected when comparing it to the blade rod torque of a first blade 5A, this may indicate problems with one of the blade rod torque sensors 10C, 10H. It can then be advantageous to include the blade rod torque measurement from a third blade 5C or make additional comparisons to determine if a sensor 10C, 10H is damaged and if so, which of the sensors 10C, 10H is the one failing.

Of course a difference in blade rod torque from blade 5A in blade position A compared to the blade rod torque of blade 5C in blade position C is likely. This is, at least partly, due to the difference in altitude. The rotor diameter of a wind turbine can exceed 100 meters. Hence, the wind speed is most likely higher at point A than at point C. In addition, wind gusts are also more likely in point A than in point C. However, such differences are expected and can be compensated for/taken into account by the wind turbine control system 12 e.g. by comparing measurement in the same point.

Therefore according to an embodiment of the present invention, it is possible to continue production even though one or more sensors 10 of a sensor system 9 fail. This is because the blade state of a first blade 5A is used to control a second blade 5B and because the sensor systems 9 are, at least partly, determining the blade state of the blades 5. Hence, if a sensor 10 of the sensor system 9B of the second blade 5B fails. Measurements from a sensor 10 of the sensor system 9A of the first blade 5A can be used to determine the blade state of the second blade 5B.

This is especially true when the first sensor system 9A comprise a sensor 10 measuring the same parameters in the first blade 5A as the damaged sensor 10 of the second sensor system 9B of the second blade 5B.

Another example is to extract main features of measurements from which it is possible to describe how the measured wind turbine component behave or describes the main trend in the measurements from which the features are extracted. These features may be compared with similar features from earlier passages of the same point by different blades e.g. in order to validate the measurements.

Such features may also in case of damaged sensors or failure in measurements from sensor(s) be used for reconstruction of these measurements or reconstruction of the blade state and thereby enable the wind turbine to continue production despite the damaged sensor(s).

Further it should be mentioned that of cause the same measurements made on one blade 5 every time that blade 5 passes a point in the rotor plane could also indicate problems with a sensor or trends such as increase of load.

Further it should be mentioned that, in some situations it might even be possible to reduce the number of sensors 10 because a sensor output e.g. from sensor 10A from a first sensor system 9A can be used in the control of the second blade 5B. Alternatively it can be possible to plan distribution of sensors for the control system 12 to receive as many different inputs as possible from the sensors available. This is because a sensor measuring one parameter related to blade 5A may not be located at the same location as another sensor measuring the same parameter in relation to blade 5B. As an example these two sensors may return the same parameter without being located at the same location e.g. the first sensor may be located at the very tip of the blade whereas the second sensor may be located e.g. half a meter from the tip of the blade.

Figure 4A:
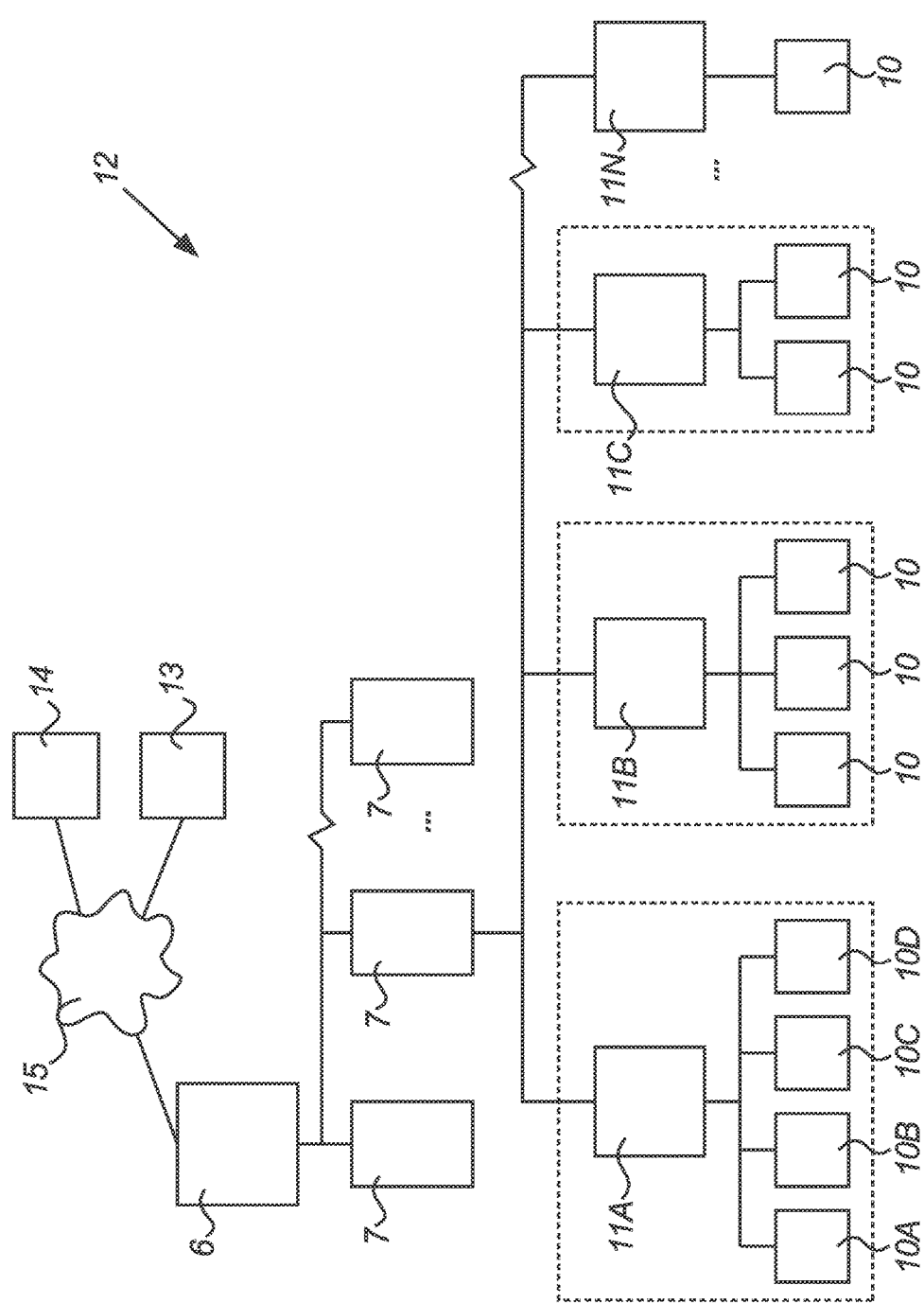
FIG. 4A illustrates a control system according to an embodiment of the invention.
Figure 4B:
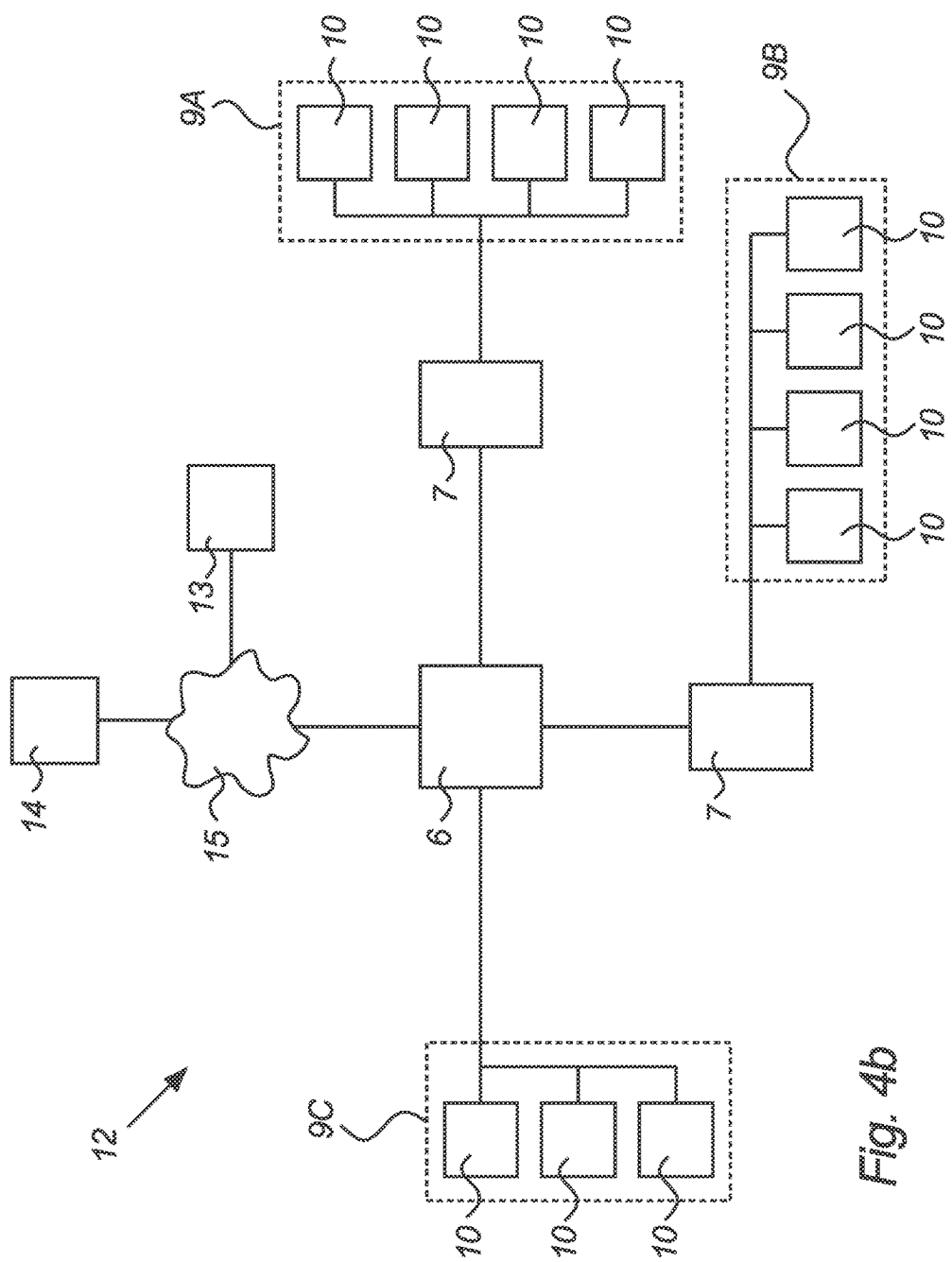
FIG. 4B illustrates a control system according to another embodiment of the invention.

FIGS. 4A and 4B illustrates examples of how the control system 12 of the wind turbine 1 can be configured according to an embodiment of the invention.

In FIG. 4A the controllers 11 of the sensor systems 9 are communicating with the wind turbine controller 6 via sub controller modules 7. For example, it is shown that the sensors 10A, 10B, 10C, 10D are communicating with the sensor system controller 11A, which either process the data or forwards the data to the sub controller module 7 where it then might be processed. The result of the processing of measured data may be or lead, to the blade state of the different blades.

In FIG. 4B the sensor systems 9 does not comprise any controllers hence the sensors 10 are communicating directly to one or more sub controller modules 7 or even directly to the wind turbine controller 6.

It should be mentioned, that the communication can be chosen from a wide range of known wired or wireless data communication standards, preferably using a wireless network or local area network.

On both FIGS. 4A and 4B it is illustrated that the wind turbine controller 6 is communicating with a service and maintenance responsible party 13, which may be the owner of the wind turbine 1 and a third party 14, for example; a grid operator, external weather prediction center, etc. In this way a party, external to the wind turbine 1, is able to monitor and/or control the wind turbine 1 from a data processor, such as a personal computer, laptop, tablet, phone, etc.

The communication to and from the wind turbine 1 may, at least partly, use a public communication network 15 such as the internet.

REFERENCE LIST

1. Wind turbine
2. Tower
3. Nacelle
4. Hub
5. Blades
6. Wind turbine controller
7. Sub controller
8. Arrow (indicating direction of revolution of the rotor)
9. Sensor systems
10. Sensors
11. Controllers of sensor systems
12. Wind turbine control system
13. Service and maintenance responsible
14. Other external party
15. Public communication network

The invention claimed is:

1. Method for controlling pitch angle of a blade on a wind turbine having at least a first blade and a second blade,
    the first blade comprise at least one first sensor system measuring at least one parameter related to a blade state of the first blade and communicating the at least one measured parameter to a controller adapted to determine a first blade state, and
    the second blade comprise at least one second sensor system measuring at least one parameter related to a blade state of the second blade and communicating the at least one measured parameter to the controller adapted to determine a second blade state,
    wherein the first blade state is defined by the controller based on the at least one measured parameter related to the first blade state,
    wherein the second blade state is defined by the controller based on the at least one measured parameter related to the second blade state, and
    wherein the pitch angle of the second blade is adjusted by the controller in advance of the arrival of the second blade in a point in the rotor plane, at least based on the first blade state determined based on the at least one parameter related to the first blade state measured in said point and further based on the blade state of the second blade.

2. Method according to claim 1, wherein the determined second blade state is time delayed in relation to the first blade state.

3. Method according to claim 2, wherein said time delay arises from the distribution of the blades in the rotor plane, and wherein the first blade is in front of the second blade when the rotor rotates.

4. Method according to claim 1, wherein the first blade state is determined at a first blade position in the rotor plane and the second blade state is determined at a second blade position in the rotor plane.

5. Method according to claim 4, wherein the first blade position in the rotor plane is substantially the same as the second blade position in the rotor plane when the pitch angle of the second blade has been controlled based on pitch angle information of the first blade.

6. Method according to claim 1, wherein
    the first blade state is defined by a blade moment of the first blade, and/or a pitch angle feedback of the first blade, and/or a deflection of the first blade and/or an acceleration of the first blade, and/or
    the second blade state is defined by a blade moment of the second blade, and/or a pitch angle feedback of the second blade, and/or a deflection of the second blade and/or an acceleration of the second blade.

7. Method according to claim 1, wherein a control system ascertains validity of the determined first blade state and/or the determined second blade state, by comparing the determined first blade state and the determined second blade state.

8. Method according to claim 7, wherein the validity is based on the difference in the blade states.

9. Method according to claim 1, wherein the control system ascertains the validity of the second blade state in a point in the rotor plane by comparing the determined second blade state with the determined first blade state in substantially the same point in the rotor plane.

10. A wind turbine configured to be controlled by a method according to claim 1.

11. Method according to claim 1, wherein said pitch angle information of the first blade comprises pitch angle feedback.

12. Method according to claim 1, wherein said control of the second blade moreover comprises controlling the yaw angle of the rotor and/or flaps on the blades.

13. Method according to claim 1, wherein measurements from a sensor of the sensor system of the first blade is used by the controller as basis for control of the pitch angle of the second blade in case a sensor of the sensor system of the second blade fails.

14. Method according to claim 1, wherein a sensor of said sensor systems is located as part of the blade or in the hub of the wind turbine.

15. Apparatus for controlling pitch angle of a blade on a wind turbine, having at least a first blade and a second blade, said apparatus comprising,
- a first blade sensor measuring at least one parameter related to a blade state of the first blade and communicating the at least one measured parameter to a controller adapted to determine a first blade state of the first blade,
- a second blade sensor measuring at least one parameter related to a blade state of the second blade and communicating the at least one measured parameter to the controller adapted to determine a second blade state of the second blade,
- wherein the controller is adapted to define the first blade state based on the at least one measured parameter related to the first blade state,
- wherein the controller is adapted to define the second blade state based on the at least one measured parameter related to the second blade state, and
- wherein the controller is adapted to control the pitch angle in advance of the arrival of the second blade in a point in the rotor plane, at least based on the first blade state determined based on the at least one parameter related to the first blade state measured in said point and further based on the blade state of the first blade and on the blade state of the second blade.

16. Apparatus according to claim 15, wherein the first blade sensor is configured to determine the first blade state in a first blade position in the rotor plane, and wherein the second blade sensor is configured to determine the second blade state in a second blade position in the rotor plane.

17. Apparatus according to claim 15, wherein the second blade state of the second blade is time delayed in relation to the first blade state of the first blade, which time delay arises from the distribution of the blades in the rotor plane.

18. Apparatus according to claim 15, wherein
- the first blade state is defined by a blade moment of the first blade, and/or pitch angle feedback of the first blade, and/or deflection of the first blade and/or acceleration, and/or
- the second blade is defined by a blade moment of the second blade, and/or pitch angle feedback of the second blade, and/or deflection of the second blade and/or acceleration of the second blade.

19. Apparatus according to claim 15, wherein a control system is configured to ascertain validity of the second blade state by comparing it with the first blade state.

20. A wind turbine controlled by an apparatus according to claim 15.

21. Apparatus according to claim 15, wherein said pitch angle information of the first blade comprises pitch angle feedback.

* * * * *